(12) United States Patent
Cariccia et al.

(10) Patent No.: US 9,631,552 B2
(45) Date of Patent: Apr. 25, 2017

(54) CONTROLLED TENSIONER FOR AN ACCESSORY DRIVE AND ACCESSORY DRIVE COMPRISING SAID TENSIONER

(71) Applicant: DAYCO EUROPE S.R.L., Chieti (IT)

(72) Inventors: Gianluca Cariccia, Oristano (IT); Federico Domenico Licata, Turin (IT); Etienne Noe, Chieti (IT)

(73) Assignee: DAYCO EUROPE S.R.L., Chieti (IT)

( * ) Notice: Subject to any disclaimer, the term of this patent is extended or adjusted under 35 U.S.C. 154(b) by 116 days.

(21) Appl. No.: 14/410,070

(22) PCT Filed: Jun. 21, 2013

(86) PCT No.: PCT/IB2013/055124
§ 371 (c)(1),
(2) Date: Dec. 20, 2014

(87) PCT Pub. No.: WO2013/190525
PCT Pub. Date: Dec. 27, 2013

(65) Prior Publication Data
US 2015/0275751 A1 Oct. 1, 2015

(30) Foreign Application Priority Data

Jun. 21, 2012 (IT) .............................. TO2012A0548

(51) Int. Cl.
*F02B 67/06* (2006.01)
*F16H 7/12* (2006.01)
*F16H 7/08* (2006.01)

(52) U.S. Cl.
CPC .............. *F02B 67/06* (2013.01); *F16H 7/12* (2013.01); *F16H 7/1281* (2013.01);
(Continued)

(58) Field of Classification Search
CPC ................ F16H 7/12; F16H 2007/083; F16H 2007/081; F02B 67/06
(Continued)

(56) References Cited

U.S. PATENT DOCUMENTS 6,834,228 B2 * 12/2004 Serkh ...................... F02B 67/06
123/195 A
8,914,190 B2 * 12/2014 Detrois .................. F02B 67/06
701/1
(Continued)

FOREIGN PATENT DOCUMENTS

DE 10118277 A1 10/2002
EP 1464870 A1 10/2004
(Continued)

OTHER PUBLICATIONS

PCT, International Search Report and Written Opinion, International Application No. PCT/IB2013/055124 (Oct. 22, 2013).

*Primary Examiner* — William E Dondero
*Assistant Examiner* — Robert T Reese
(74) *Attorney, Agent, or Firm* — Thompson Hine LLP

(57) ABSTRACT

A tensioner for a start-stop accessory drive comprises a movable support, a pulley carried by the support to contact a belt of the drive, a spring to load the support so as to tension the belt, and an actuator controlled and movable to push said pulley against the belt in one direction by means of a load in parallel and additional with respect to that of the spring and an irreversible device which enables the action of the actuator and prevents a displacement of said support in response to the loads of the belt.

10 Claims, 4 Drawing Sheets

(52) U.S. Cl.
CPC ............... *F16H 2007/081* (2013.01); *F16H 2007/0823* (2013.01); *F16H 2007/0885* (2013.01); *F16H 2007/0887* (2013.01)

(58) Field of Classification Search
USPC ........................................................ 474/135
See application file for complete search history.

(56) References Cited

U.S. PATENT DOCUMENTS

| | | | |
|---|---|---|---|
| 2002/0052260 A1 | 5/2002 | Kitamura et al. | |
| 2007/0137593 A1* | 6/2007 | Di Giacomo | F01P 5/12 123/41.44 |
| 2008/0058148 A1* | 3/2008 | Adel | F16H 13/14 475/195 |
| 2008/0184832 A1* | 8/2008 | Persiani | H02K 7/075 74/421 A |
| 2014/0309882 A1* | 10/2014 | Antchak | F02B 67/06 701/36 |

FOREIGN PATENT DOCUMENTS

| | | | |
|---|---|---|---|
| WO | 2005/116486 A1 | 12/2005 | |
| WO | 2006/005737 A1 | 1/2006 | |

* cited by examiner

CONTROLLED TENSIONER FOR AN ACCESSORY DRIVE AND ACCESSORY DRIVE COMPRISING SAID TENSIONER

RELATED APPLICATION DATA

This application is a National Stage filing of International Application No. PCT/IB2013/055124 filed Jun. 21, 2013, which claims the benefit of Italian Application No. TO2012A000548 filed Jun. 21, 2012.

TECHNICAL FIELD

The present invention refers to an accessory tensioner for a belt accessory drive of an internal combustion engine of vehicle.

BACKGROUND ART

In a traditional accessory drive, a loose branch of the drive remains loose both during operation of the internal combustion engine and during starting of the latter. In particular, the expression loose branch indicates the branch arranged between two pulleys, the mean tension of which in use is lower than that of all the other branches. Normally the loose branch of a traditional accessory drive is arranged immediately downstream of the crankshaft pulley with respect to the belt rotation direction. Furthermore, in a traditional accessory drive, the electric machine is an alternator which is driven either by the crankshaft pulley or by the starter motor.

In a start-stop accessory drive, on the other hand, the torque transmitted varies when the internal combustion engine drives the belt and when the belt is driven by a motor generator connected to the drive to start the internal combustion engine.

When the torque acting on the belt changes direction, a tight branch of the belt drive can become loose and vice versa and the belt tension must be checked to prevent slipping during all the operating conditions of the drive and in particular of the transients.

A traditional tensioner must be sized to guarantee correct tensioning of the belt in the most severe conditions, i.e. during starting, but said tension is excessive during the other operating conditions, for example when the vehicle is running. In particular, the belt tension impacts on the sizing of further engine components, such as the shaft bearings of the accessories connected to the drive and on the friction dissipation of the drive. It is therefore preferable for the belt tension to be kept as low as possible compatibly with the operating conditions.

DISCLOSURE OF INVENTION

The object of the present invention is to produce a controlled tensioner for an accessory drive and an accessory drive able to meet at least partly the above needs.

The object of the present invention is achieved by means of a tensioner according to claim 1 and a drive according to claim 2.

BRIEF DESCRIPTION OF THE DRAWINGS

For a better understanding of the present invention, some preferred embodiments, provided purely by way of explanatory and non-limiting example, will now be illustrated with reference to the accompanying drawings (not to scale), in which.

BEST MODE FOR CARRYING OUT THE INVENTION

Figure 1:
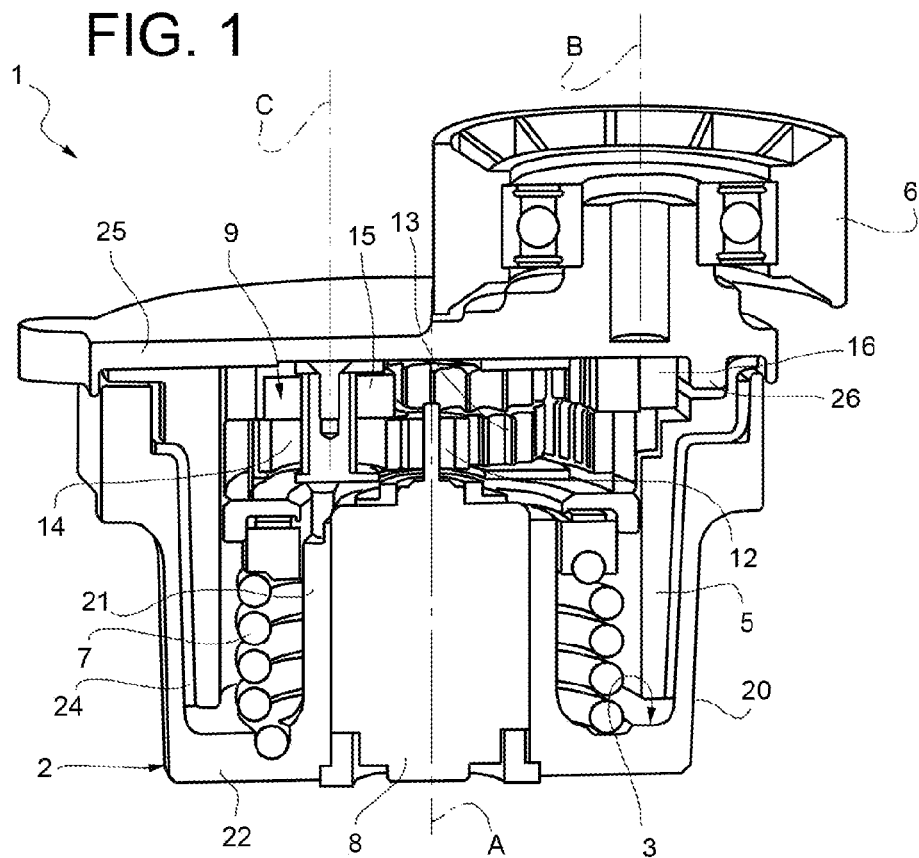
FIG. 1 is a perspective view with details in section of a first embodiment of the present invention.
Figure 2:
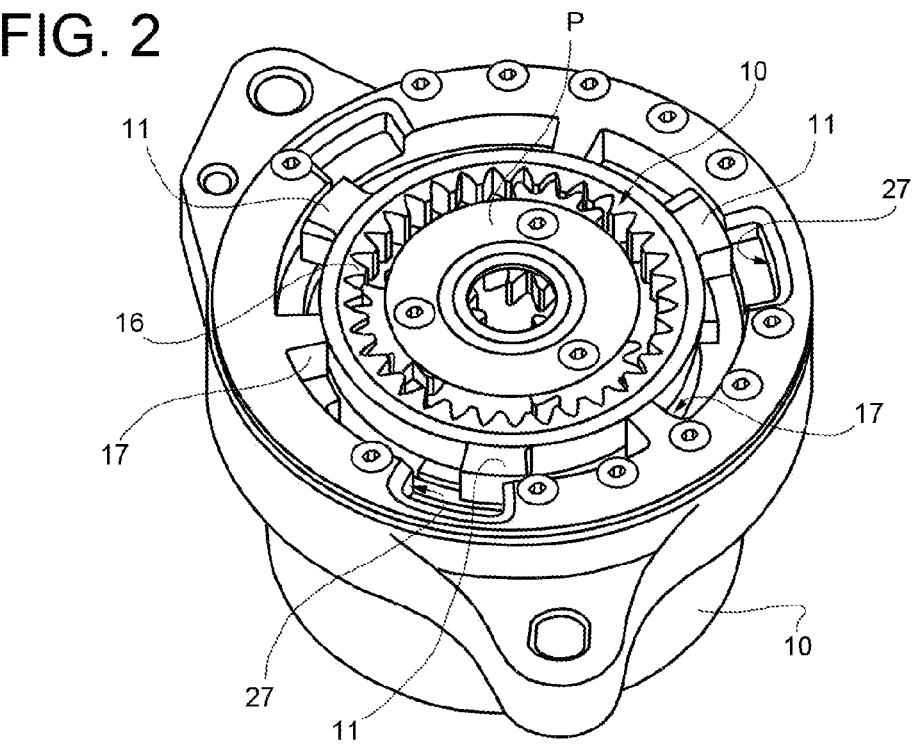
FIG. 2 is a second perspective view of the tensioner of FIG. 1 with details removed for clarity.
Figure 3:
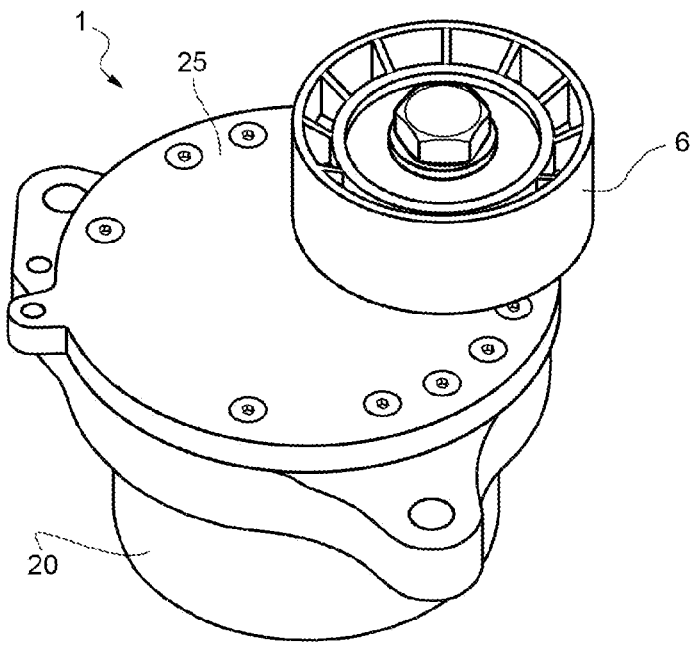
FIG. 3 is a perspective view of the tensioner of FIG. 1.

In FIG. 1 the number 1 illustrates, as a whole, a tensioner comprising a base body 2 defining a cavity 3, a pivoting support 4 having a portion 5 housed in the cavity 3 to rotate about an axis A and a pulley 6 mounted on the support 4 and revolving idle about an axis B spaced from the axis A.

The tensioner 1 furthermore comprises a spring 7 acting on the support 4 to apply a torque and tension a belt of a start-stop accessory drive of an internal combustion engine (not illustrated), a rotary motor 8 housed in the cavity 3 with the spring 7, and a gear 9 to control a thrust element 10 selectively contacting the support 4. In particular, the thrust element 10 can only delimit the maximum angular displacement of the support 4 in the direction of loading of the spring 7 and, alternatively or in combination, apply a torque to the additional support 4 with respect to that of the spring 7 to increase the tension of the belt. In particular, the thrust element 10 can comprise a plurality of projections preferably angularly equidistant and rotated in both rotation directions by means of the gear 9 operated by means of the motor 8.

Preferably, the gear 9 is planetary to obtain a high gearing down or reduction of the number of revolutions of the motor 8 and can have two reduction stages. A first reduction stage comprises a sun gear 12 revolving about the axis A, planet gears 13 meshing with the sun gear 12 and an outer ring 14 connected not by free rotation to the body 2, for example rigidly. A second reduction stage comprises further planet gears 15 rotated by the planet gears 13 and a rotating ring 16 which meshes with the planet gears 15 and controls rotation of the projections 11. The projections 11 selectively contact corresponding abutments 17 of the support 4 to define the maximum angular displacement and/or to apply an additional torque to that of the spring 7. The rotating ring 16 is furthermore centred around the axis A by means of the planet gears 15, each of which is preferably rigidly connected to a respective planet gear 13. Preferably, the planet gears 13 and 15 are rotated about the axis A by a carrier P defining a respective axis C for each pair having a planet gear 13 and a planet gear 15. Even more preferably, the outer ring 14 is axially interposed between the rotating ring 16 and the motor 8. Advantageously, the planet gears 13, 15 are rigidly connected also in an axial direction to the carrier P to define a pre-assembly block with a configuration such as to be assembled after the sun gear 12 and the outer ring 14.

Advantageously, the support 4 comprises shaped projections each of which defines at least one abutment 17.

The gear 9 previously described is irreversible to maintain a pre-determined angular position of the projections 11 also in the absence of electricity supplied to the motor 8 and in the presence of an action of the support 4 following an increase in the belt tension while the projections 11 are in contact against the abutments 17.

According to the embodiment illustrated in FIG. 1, the body 2 comprises a tapered wall 20 converging on the opposite side of the gear 9 and a cylindrical wall 21 coaxial with the axis A and concentric to the tapered wall 20 to define a seat for the motor 8 inside the cavity 3. In particular, the motor 8 is closed axially in the cylindrical wall 21 by means of a cover 22 fixed to a base flange 23 of the body 2 which connects the cylindrical wall 21 to the tapered wall 20 on the opposite axial side of the gear 9. In this way, the motor 8 and the spring 7 are on the same axial side with respect to the gear 9.

The portion 5 of the support 4 is also tapered and couples with the tapered wall 20 by means of a coupling 24 to close the axial play and reduce the friction when the support 4 rotates with respect to the body 2. In particular, the radial centring of the support 4 for the rotation about the axis A is defined by the combination of the tapered wall 20 and the coupling 24 or by the sole tapered wall 20. Furthermore, the gear 9 is housed in the support 4, i.e. the support 4 surrounds the gear 9, and also the spring 7 comprises loops which have a radial dimension smaller than those of the portion 5 but greater than that of the motor 8.

The support 4 furthermore axially covers the gear 9 by means of a head wall 25 illustrated in FIG. 1. The head wall 25 combined with the body 2 closes the gear 9 in a volume protected from contamination of external agents so as to guarantee a prolonged working life of the gear. In particular, the head wall 25 is rigidly connected to the portion 5, for example by means of a riveted connection, and bears the pulley 6. Furthermore, the head wall 25 has a plurality of projections 26 parallel to the axis B and arranged on the opposite axial side of the pulley 6. The projections 26 couple in respective slots 27 defined by the portion 5 near the abutments 17 to define a torsionally rigid coupling with the portion 5. The rivets couple in an axial direction the head wall 25 and the portion 5 of the support 4 while the torque is transmitted by the thrust element 10 to the pulley 6 substantially by means of a form and force fit between the slots 27 and the projections 26.

Figure 4:
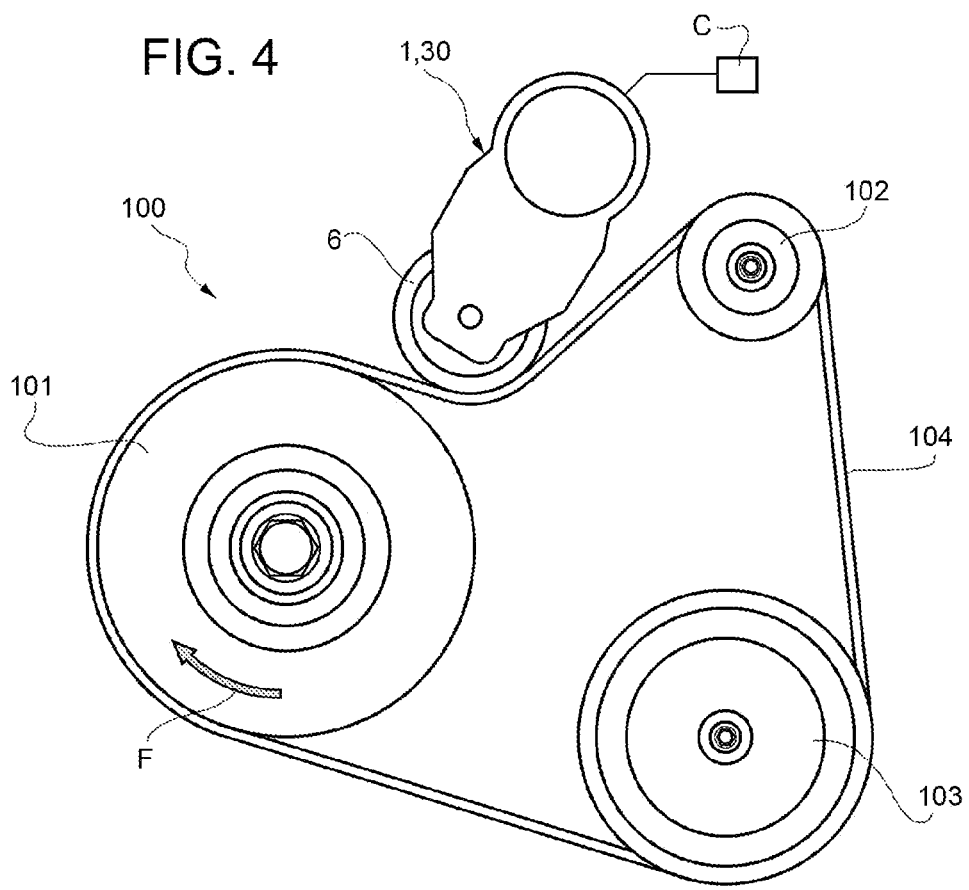
FIG. 4 is a front view of a drive having tensioner according to the present invention.

In FIG. 4, the number 100 illustrates, as a whole, an accessory drive comprising a pulley for a crankshaft 101, a pulley for a reversible electric machine, i.e. a motor generator 102, and pulley for an accessory 103 connected by a belt 104. The drive 100 furthermore comprises the tensioner 1 and the pulley 6 contacts a branch L of the drive 100 which is loose when the pulley for the crankshaft 101 controls the drive 100.

When the crankshaft pulley 101 has to be started via the motor generator pulley 102 (the drive rotation direction is illustrated by the arrow F in FIG. 4), an electronic control C controls rotation of the projections 11 to contact the abutments 17 so that the support 4 pushes the pulley 6 into an advanced position towards the release direction of the spring 7, which corresponds to a tensioning action of the belt. In this configuration, the greater tension of the belt loads the spring 7 only in a limited manner and the projections 11 contact the respective abutments 17 to prevent retraction of the pulley 6 following the tension increase in the branch contacted by the pulley and/or to apply to the support 4 a torque additional to that of the spring 7. The angular position of the projections 11 is maintained by opposing the retraction action of the pulley 6 also when the motor 8 is not energised since the gear 9 is irreversible, i.e. a torque applied to the rotating ring 6 does not generate a rotation of the sun gear 12.

Furthermore, the motor 8 and the reduction gear 9, acting on the support 4 in parallel to the spring 7, are sized so as to be able to apply on the belt 104 an additional load to that of the spring.

When the belt drive is driven by the crankshaft pulley 101, the projections 11 are rotated by means of the motor 8 to define an angular distance of the respective abutments such as to enable a retraction of the pulley 6 greater than that permitted when the internal combustion engine is started. In this way the support 4 can oscillate angularly in a substantially free manner loaded by means of the spring 7.

In both the operating conditions and relative transients, the tensioning torque acting on the support 4 is always active so that a forward movement of the pulley 6 is not obstructed by the projections 11 which therefore act as a simple support and/or apply a thrust. The support 4 therefore cannot be blocked angularly in two directions but only in one direction and in a manner depending on the angular position of the projections 11. In particular, the support 4 can be blocked in one direction by the projections 11 in the rotation direction that loads the spring 7.

Advantageously, the belt tension can be varied according to the operating conditions of the drive 100 as below.

In the description and in the claims the term 'idle-stop' indicates the stop condition of the internal combustion engine when the vehicle is at a standstill only temporarily, for example when it has stopped at a red traffic light. For the entire duration of the idle-stop condition, the user is on board the vehicle and the latter is started following one single movement of the user, such as a pressure on the accelerator pedal. Stopping of the internal combustion engine in 'idle-stop' is automatic and controlled by means of the vehicle control unit.

In the description and in the claims, the term 'stop by the user' refers to stoppage of the internal combustion engine when the vehicle is parked and the user, via the key or analogous device, interrupts the power supply to the vehicle control panel and control unit and gets out of the vehicle, for example. A vehicle is started after a 'stop by the user' condition when the user powers the vehicle control unit by means of the key or equivalent device while the engine is off. Stoppage of the internal combustion engine in 'stop by the user' mode is controlled by means of a voluntary action by the user.

According to a preferred embodiment of the present invention, the tensioner 1 is controlled to increase the tension with respect to the level generated by the spring 7 at least when the internal combustion engine is started after a 'stop by the user' or an 'idle-stop'.

Preferably, the level of tension applied on the belt at starting after an 'idle-stop' is greater than the one applied at starting after a 'stop by the user'.

In this way it is possible to guarantee a more prompt drive response and a safer and quicker engine start during starting after 'idle-stop'.

Furthermore, the motor 8 can be sized to provide a torque such that the tension on the belt 104 is minimum to guarantee the first moment of the start without noise and/or slipping, said tension being called initial starting tension. It should be pointed out that, following operation of the motor generator, the tension on the branch L increases by the value required to provide the starting torque necessary to control the crankshaft pulley 101 due to the fact that the thrust element 10 does not rotate, in the loading direction of the spring 7. Said increase is therefore a consequence of the transmission of torque from the motor generator pulley 102 to the crankshaft pulley 101 and is obtained also if the power supply to the motor 8 is interrupted after the initial starting tension is reached.

It may also happen that the tension oscillation induced in the belt during starting is such that lower values are reached with respect to the initial starting tension and that corresponding slacks occur. In this case, the tensioner 1 can promptly recover said slacks by means of the action of the spring 7 and control of the tensioner 1 can ensure that during starting, the motor 8 is maintained energised so that the thrust element 10 follows any rotation of the support 4 when the slack is recovered by means of the action of the spring 7. When the belt tension is high again, the pulley 6 is in a more advanced position towards the belt with respect to that of the initial starting moments and cannot retract due to the constraint defined by the irreversible gear 9. In this way, the motor 8 is sized to apply a load on the belt and generate a high but not maximum belt tension during starting. For example, the initial starting tension can be 800 Newton and the theoretical tension required on the same branch in dynamic conditions to start the internal combustion engine can exceed 2000 Newton.

Therefore, the maximum tension of the belt is reached due either to the transmission of torque by the motor generator pulley 102 to the crankshaft pulley 101 when the motor 8 is not powered after the initial starting tension has been reached, or to the irregularity of the loads applied to the belt during starting when the motor 8 is powered and controls the thrust element 10 to follow the rotations of the support 4 in the release direction of the spring 7. In particular, the belt tension can be controlled at two levels, one of which, low and defined by the torque applied via the spring 7 to the support 4, for operation of the drive when the internal combustion engine has already been started; and a second, high, suitable only for the starting phase and defined by the thrust of the motor 8 on the support 4. It is important to note that in this way the mean tension of the belt drops with respect to a configuration in which a known tensioner is sized to guarantee one single level of tension sufficient in all operating conditions and this results in lower friction dispersions and consumption.

Figure 6:
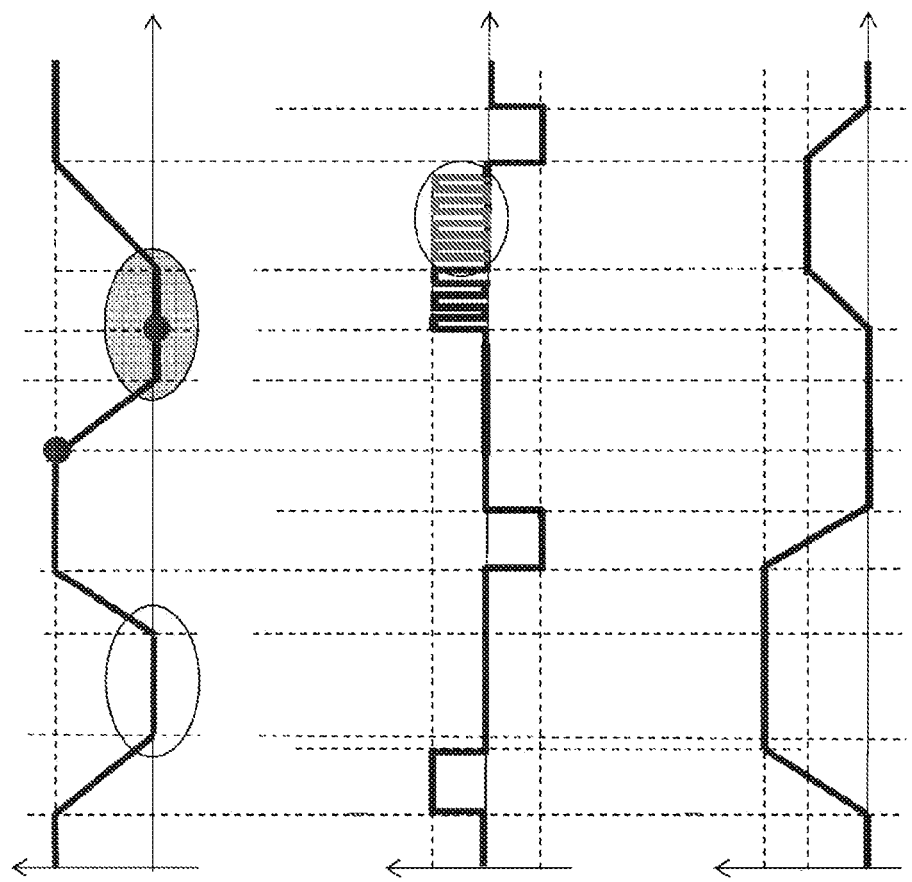
FIG. 6 illustrates control diagrams of a tensioner of the drive according to the present invention with particular reference (from top to bottom) to the operating state of the internal combustion engine, of the tensioner control electric voltage and the belt tension.

If required, the maximum tension necessary during starting is reached in successive stages with an increase every time the structure 4 rotates and overrides the thrust element 10 to recover a slack in the belt and the motor 8 operates the thrust element 10 to follow said rotation. The belt tension drops only after the sun gear 12 is commanded to retract the pulley 6 with respect to the belt by means of an inversion of the power supply voltage to the motor 8 (phases F, N in FIG. 6).

When the internal combustion engine operates regularly while the vehicle is running, for example, the tensioner 1 is controlled so that the thrust element 10 is angularly spaced from the abutments 17 and the tension on the belt 104 is applied exclusively by the spring 7. Running of the vehicle can be detected by means of a signal sent by the clutch which connects the internal combustion engine to the speed change and the wheels.

Advantageously, the effect of increasing the belt tension by exploiting the tension oscillations during starting by means of continuous supply of the motor 8 during starting can also be achieved in a traditional accessory drive, i.e. where the same branch remains loose both when the internal combustion engine operates, for example to command running of the vehicle, and during starting of the internal combustion engine. During starting of the internal combustion engine connected to a traditional accessory drive, the tension fluctuations of the loose branch can be very high, generating considerable displacements of the pulley 6. When during starting the pulley 6 tends instantaneously to move towards the area of contact with the belt, i.e. in the direction in which the spring 7 tends to release, the support 4 rotates and the thrust element 10 follows said rotation due to the action of the motor 8. In this way, when the pulley tension increases again, the action of the thrust element 10 prevents the pulley 6 from retracting due to the greater load applied by the belt and this generates an increase in the belt tension. This increase prevents slipping of the belt during starting and consequent noise. Furthermore, at the end of the starting phase, the motor 8 commands rotation of the thrust element 10 so as to free rotation of the support 4 so that the belt is stretched by the sole action of the spring 7, which is therefore sized at a relatively low tension and sufficient to guarantee operation in the operating conditions of the internal combustion engine which do not comprise the starting. In this way the belt tension during operation of the internal combustion engine is relatively low so as to reduce stress and friction.

The greater tension necessary to avoid noise and slipping during starting of the internal combustion engine is guaranteed by operation of the motor 8 so that the thrust element follows the rotations of the support 4 in the release direction of the spring 7 and by the retraction resistance applied by the pulley 6 on the belt via the action of the thrust element 10.

Figure 5:
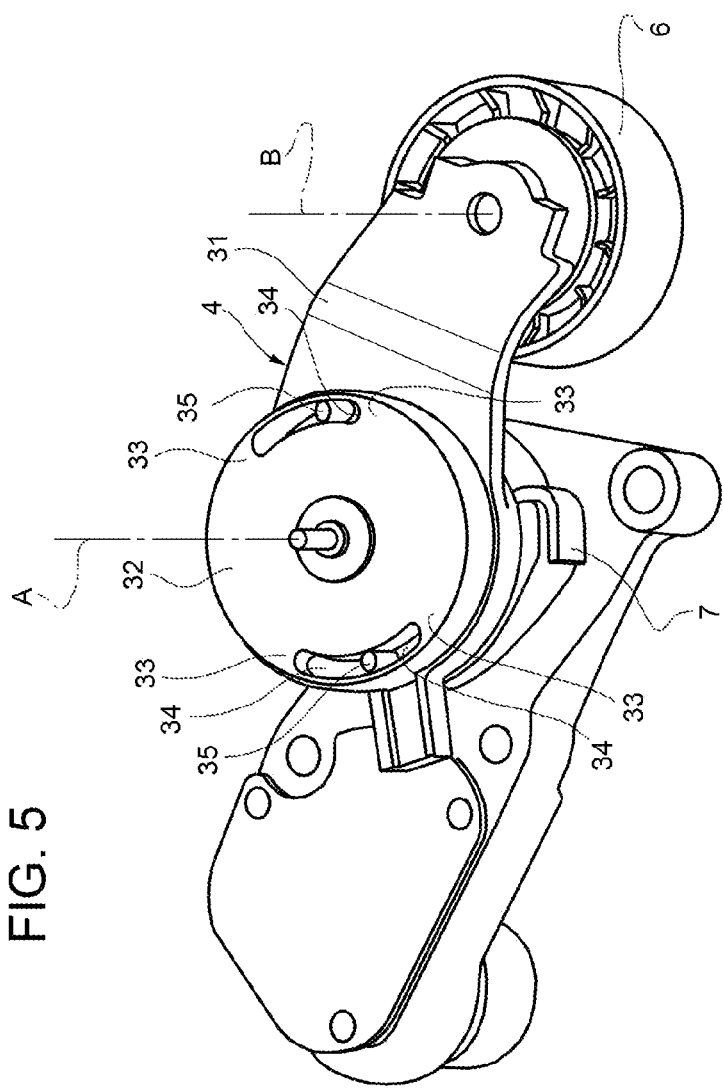
FIG. 5 is a perspective view of a tensioner according to a further embodiment.

According to a further embodiment of the present invention illustrated in FIG. 5, a tensioner 30 is now described for which the reference numbers used above will be used for components that are identical or functionally the same with respect to the description of the preceding paragraphs. Furthermore, the tensioner 30 differs from the tensioner 105 only in the aspects specified below.

The tensioner 30 comprises a support 4 having an arm 31 to space the axis B of the pulley 106 with respect to the axis A. Furthermore, the spring 7 is a spiral spring, i.e. a spring with rectangular transverse section having a variable curvature, for example to produce an Archimedes' spiral.

The rotating ring 16 is rigidly connected to a disc 32 which axially closes the structure 4 on the body 2. Therefore, the structure 4 can rotate angularly with respect to the disc 32 which is moved by means of the motor 8 (not illustrated in the figure).

Furthermore, the disc 32 defines the stop element 10 and comprises a plurality of stops 33 which, in pairs, define respective grooves 34. The structure 4 furthermore comprises pins 35, each of which engages in a groove 34.

In use, when the pulley 6 has to be locked in an advanced direction, the disc 32 is operated to rotate so that the stops 33 contact the pins 35, thus the arm 31 can rotate only to advance the position of the pulley 6.

The advantages of the tensioner 1, 30 and the drive 100 previously described are the following.

A first and a second level of tension for the idle-stop and for the stop by the user allow further optimisation of the drive tension level.

The combination of an irreversible device like the gear 9, of an actuator 8, which only preferably is a rotary motor, applying a load to the pulley 6 in parallel with respect to that of the spring 7, and the fact that the support 4 is pushed in one direction in the release direction of the spring 7, allows optimisation of the dimensions of the actuator not to the maximum tension necessary during starting but to the lower one necessary during the initial moments of starting. Therefore the dimensions and/or power of the actuator can be reduced.

Furthermore, the tensioner 1, 30 can be controlled in an open loop, processing the signals relative to the state of operation of the motor generator 102 from motor or generator, from the on-off state of operation of the internal combustion engine, and from the open-closed state of connection of the clutch between motor and speed change.

By means of a rotary motor and a gear mounted radially internal to the spring 7 it is possible to obtain a compact configuration of the tensioner and maximum dependability' of movement transmission since all the moving parts, and in particular the gear, can be protected by the tensioner body.

When the thrust element 10 is configured to selectively contact the support 4 and apply a load to the latter in parallel to the spring 7, it is possible to obtain a tensioner able to apply very high tensions to the belt, in particular due to the action of the motor 8. The spring 7 can be thus sized for operating conditions where the belt tension is lower.

The support 4 surrounds the gear 9 so as to define an at least partial protection for the latter. In the embodiment of figure the wall 25 defines a protection in both the radial direction and in the axial direction. In the embodiment of FIG. 4 the structure 4 radially protects the gear 9 and the disc 33 axially protects the gear 9 in addition to defining the thrust element 10 by means of the stops 33.

Lastly, it is clear that modifications or variations can be made to the tensioners described and illustrated here without departing from the protective scope as defined by the attached claims.

An electronic control device of the motor 8 can also be provided on board the tensioner 105. In this way it is possible to mount the tensioner 105, 30 in a belt drive without reprogramming the internal combustion engine control unit. This can be advantageous when the tensioner 105, 30 is mounted on motors controlled by pre-programmed control units.

The motor 8 can be replaced by another actuator, also non-rotary, for example by a linear actuator.

The gear 9 can be replaced by any other irreversible device to counter the movement of the support 4. In particular, a device is irreversible when it can generate the displacement in one direction of a driven element, in this case the support 4 towards the belt, and an action applied to the driven element from the outside in the opposite direction, in this case by the belt in the loading direction of the spring 7, does not generate a relative displacement of the driven element. Therefore, also the motor 8 could operate as an irreversible device if it were controlled to push the support 4 in the release direction of the spring 7 and withstand any action applied by the belt to the support 4 in the opposite direction.

The support 4 can either pivot around an axis A or move in a rectilinear manner.

The invention claimed is:

1. A tensioner for a start-stop accessory drive comprising:
a movable support,
a pulley carried by said support to contact a belt of said drive,
a spring to load said support in such a manner as to tension said belt, and an actuator controlled and movable to thrust said pulley against said belt in one direction by means of a load, in parallel and additional with respect to that of said spring and an irreversible device which enables the action of said actuator and prevents a displacement of said support in response to the loads of said belt.

2. An accessory drive comprising:
at least one crankshaft pulley,
an accessory pulley,
a motor-generator pulley,
a belt to connect said crankshaft pulley, said accessory pulley, said motor-generator pulley, and a tensioner according to claim 1, and
a control unit to control said actuator and apply said additional load in a starting condition of the internal combustion engine.

3. The drive according to claim 2, characterized in that said control unit controls said actuator to apply said additional load while the internal combustion engine is still switched off and before it is started up.

4. The drive according to claim 2, characterized in that said control unit controls said actuator to apply a further additional load in a starting condition of the internal combustion engine after an idle stop, said further additional load being greater with respect to said additional load applied during starting after a stop by the user.

5. The drive according to claim 4, characterized in that said control unit controls said actuator to apply said further additional load when the internal combustion engine is switched off for the idle stop.

6. The drive according to claim 2, characterized in that said control unit controls said actuator in such a manner that said belt maintains a tension value substantially defined by said spring at least when a signal is received indicating that a clutch for connecting the engine to the vehicles wheels is engaged.

7. The drive according to claim 2, characterized in that said actuator is supplied during the starting step of the internal combustion engine in such a manner as to be able to follow said support when said pulley advances toward said belt following the action of said spring.

8. The drive according to claim 2, characterized in that said pulley contacts a loose branch of said belt when said drive is driven by said pulley of the crankshaft.

9. The drive according to claim 2, characterized in that said actuator is controlled in an open loop.

10. The drive according to claim 9, characterized in that said control unit processes a control signal relating to the state of operation of the motor-generator and of the internal combustion engine to control said tensioner.

* * * * *